March 7, 1950 M. WALLACE 2,499,894
SYNCHROMETRIC AZIMUTH REPORTING SYSTEM
Filed Sept. 23, 1947 2 Sheets-Sheet 2
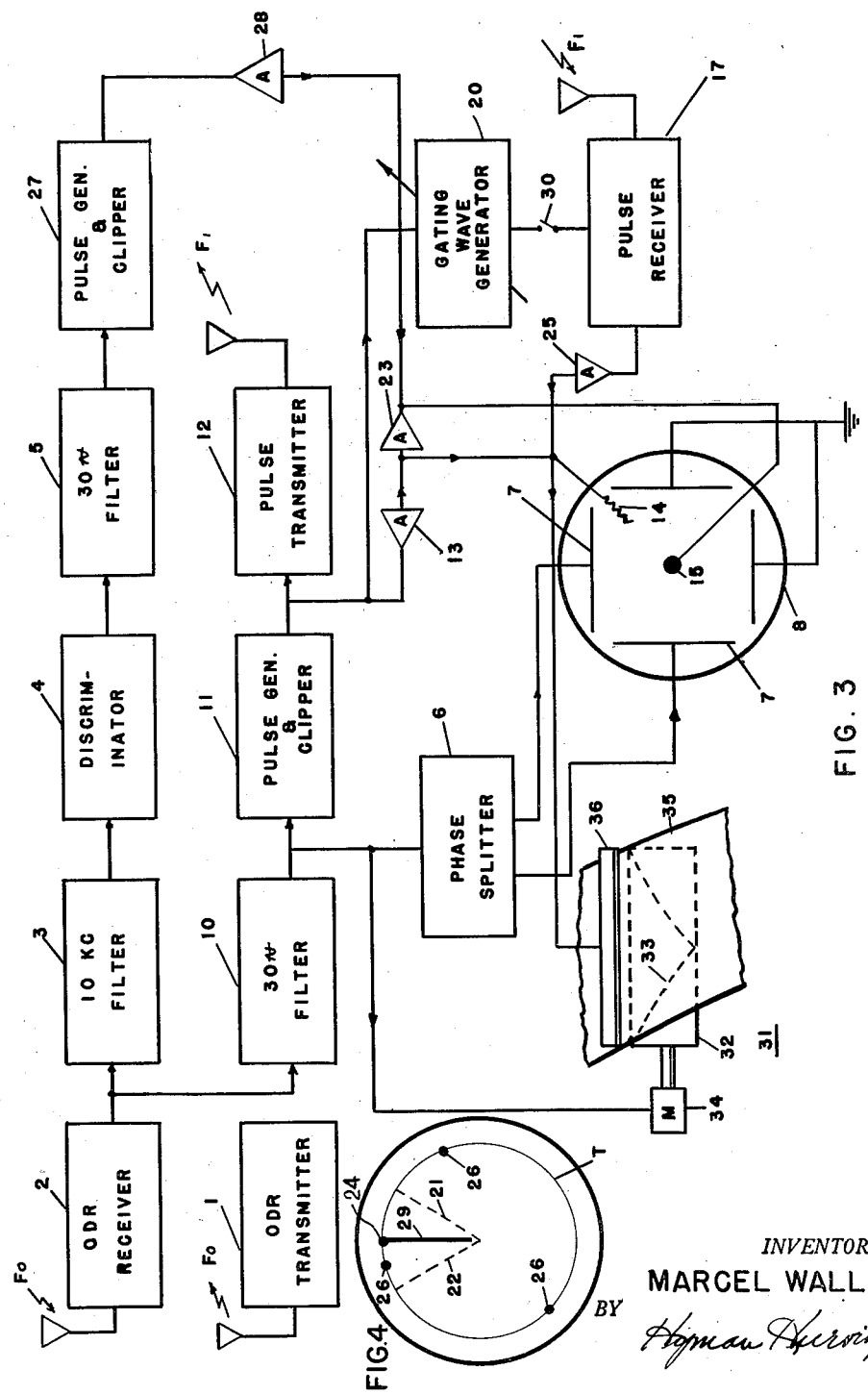
INVENTOR.
MARCEL WALLACE
BY Patented Mar. 7, 1950

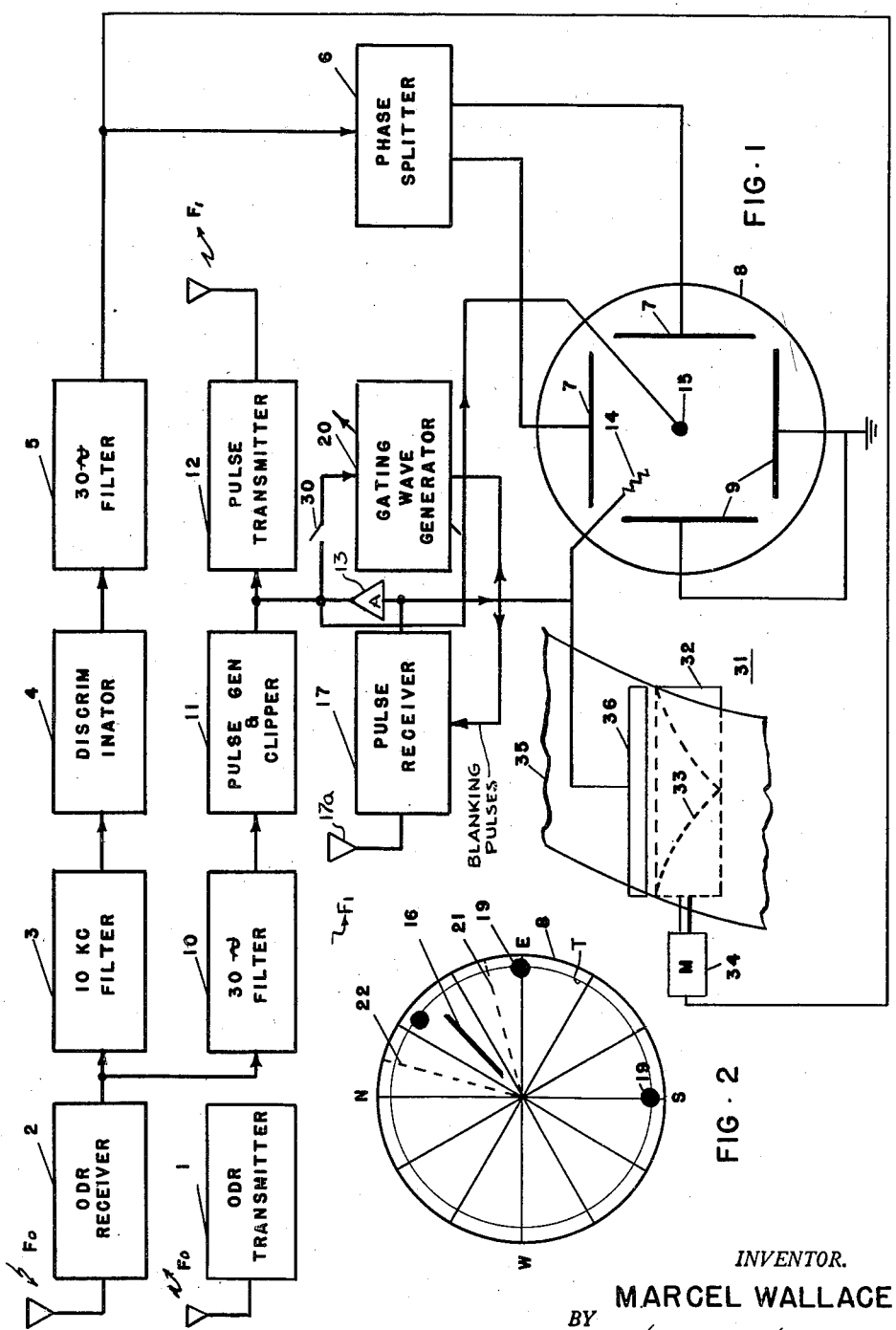

2,499,894

UNITED STATES PATENT OFFICE 2,499,894

SYNCHROMETRIC AZIMUTH REPORTING SYSTEM

Marcel Wallace, East Port Chester, Conn.

Application September 23, 1947, Serial No. 775,697

24 Claims. (Cl. 343—102)

This application is related in general concept and subject matter to my co-pending application Serial No. 775,698, filed concurrently with the present application, and entitled "Synchrometric multiplexing system" and to my co-pending application Serial No. 775,696, filed concurrently with the present application, and entitled "Synchrometric time position indicator systems."

This invention relates generally to systems of radio aids to air navigation and more particularly to systems of this character which provide visual indications of bearings of each of a group of aircraft with respect to an omnidirectional radio beacon, aboard each of the craft of the group.

It is a primary object of the invention to provide an indicating system for indicating bearings of each of a plurality of aircraft with respect to a given geographical location.

It is a further object of the invention to provide a system for transmitting from each of a plurality of aircraft flying in the vicinity of a given omnidirectional beacon station signals phased in accordance with the bearing of the aircraft from the station.

It is another object of the invention to provide a system of radio aids to navigation wherein transmissions from an omnidirectional radio beacon are utilized for providing a time interval common to all the aircraft flying adjacent to the beacon and wherein the bearing of each of the craft is represented as a time within the time interval.

It is still a further object of the invention to provide a system of radio aids to navigation wherein transmissions from an omnidirectional radio beacon are received aboard each of a plurality of the craft and utilized for controlling an indicator aboard each of the craft in precise synchronism, and further to control transmissions of signals from each of the craft which may be received by all the craft and translated into indications of bearing by the aforementioned indicator.

It is another object of the invention to provide a system of radio aids to navigation utilizing periodic pulse transmissions from each of a plurality of aircraft, the pulses having time positions corresponding with the bearings of the several aircraft.

It is a further object of the invention to provide a system of radio aids to aerial navigation for aircraft wherein pulse time position modulated signals are transmitted from each of the craft, the time positions of the pulses being controlled by signals deriving from an omnidirectional radio beacon transmitter and being interpreted in terms of bearing by combination of the pulse time position modulated signals with the signals originating at the beacon.

Generally described, the present invention involves a conventional type of omnidirectional beacon transmitter on the ground and a receiver aboard each of a plurality of aircraft for receiving and translating the signals provided by the beacon, and certain transmitting and indicating equipment controlled by the output signals of the receiver. For purposes of brevity, the omnidirectional radio beacon transmitter will be referred to hereinafter as an ODR transmitter, and the receiver for receiving and translating signals deriving from the ODR transmitter will be referred to as an ODR receiver.

The ODR transmitter itself forms no part of the invention and may be of conventional character. Various types of such transmitter are known to the art, all of which operate upon similar principles. The Civil Aeronautics Authority has standardized one specific type of ODR system for use on airways in the United States, and by international agreement this same system has been standardized for use internationally. Briefly described, the standard ODR transmitter comprises means for transmitting a carrier which is amplitude modulated with a ten kilocycle subcarrier, the latter being in turn frequency modulated at thirty cycles. The carrier referred to is transmitted in all directions with equal phase and upon abstraction of the thirty cycle modulation referred to, the latter provides a reference signal of constant phase in all directions from the transmitter. There is further transmitted a rotating pattern of radio energy utilizing the same carrier frequency, the pattern rotating at the rate of thirty cycles per second and being so proportioned that upon reception in a stationary receiver the rotation of the pattern is translated into an effective amplitude modulation of the carrier having a frequency of thirty cycles per second and a phase determined by the bearing of the receiver with respect to the transmitter.

The present invention utilizes the ODR transmissions above briefly described in a manner which will become clear as the description proceeds. The details of the transmitter itself, however, forms no part of invention, and accordingly, the transmitter is not further described and is not illustrated in detail.

Each aircraft flying the airways is required in accordance with regulations of the Civil Aeronautics Authority to carry an ODR receiver. The output of the receiver comprises a ten kilocycle subcarrier which is frequency modulated at thirty cycles and also a thirty cycle signal which has a phase dependent upon the bearing of the receiver with respect to the transmitter. In accordance with the present invention, the constant phase thirty cycle signal derived from the ten kilocycle subcarrier may be utilized to rotate the beam of a cathode ray tube indicator aboard each of a plurality of aircraft, providing a precisely synchronized periodic trace on the indicators of all the aircraft flying in the vicinity of a given ODR transmitter. The thirty cycle signal of variable phase is utilized to modulate the pattern provided on the face of the cathode ray tube indicator at a point along the trace determined by the instantaneous phase of the signal. The thirty cycle signal of variable phase is further utilized to generate a pulse at a time position bearing a fixed relation to the phase of the signal. The pulse is transmitted by radio from each aircraft to all other aircraft in the vicinity, the latter being provided with pulse receivers, the outputs of which may be utilized further to modulate the trace on the cathode ray tube indicator at times corresponding with the times of reception of the pulses. Since all the aircraft are provided with mutually synchronized traces and since all the aircraft transmit pulses having time positions corresponding with their bearings within the time intervals corresponding with the trace time of the beam of the cathode ray tube indicator, these pulses being received from all the aircraft aboard each of the aircraft, and utilized aboard each of the aircraft to modulate or intensify the beam of the cathode ray tube, there is provided on the face of the cathode ray tube indicator aboard each of the aircraft visual indications of the bearings of each of the craft.

In the modification of the system the thirty cycle signal of variable phase aboard each of the aircraft is utilized to control the movement of the beam of the cathode ray tube indicator aboard that craft, the system otherwise remaining identical with that previously described. In this manner the bearing of the local craft is indicated always at the same position on the face of the cathode ray tube indicator despite variations in the bearing of the craft, and the bearings of all other craft are respresented as relative bearings with respect to the bearing of the first mentioned craft.

If desired, the pulse receivers aboard each of the aircraft of the system may be time gated to prevent reception of pulses corresponding in time position with bearings which are widely dissimilar from the bearing of the receiving aircraft, thus eliminating from the face of each cathode ray tube indicator all bearing indications except those of the local craft and craft having adjacent bearings thereto.

My invention may be better understood by reference to the following description taken in connection with the accompanying drawings, and its scope will be pointed out in the appended claims.

In the drawings Figure 1 is a functional block diagram of one embodiment of the invention;

Figure 2 represents the appearance of the face of a cathode ray tube indicator employed in the system of Figure 1;

Figure 3 is a functional block diagram of a modification of the system of Figure 1; and Figure 4 represents the appearance of the face of a cathode ray tube indicator utilized in the system of Figure 3.

Referring now specifically to Figure 1 of the drawings, the reference numeral 1 represents an ODR transmitter which provides signals of the nature hereinabove described and specifically involving an omnidirectional carrier $F_0$ modulated in amplitude by a ten kilocycle subcarrier, the latter in turn being frequency modulated by a thirty cycle signal. The thirty cycle signal, as has been explained, provides a reference signal of identical phase in all directions from the transmitter 1. Transmitter 1 further provides a thirty cycle modulation of different phase for each bearing from the transmitter.

Aboard each of the aircraft is provided an ODR receiver 2 at the output of which is available a ten kilocycle subcarrier which is frequency modulated at thirty cycles and a thirty cycle signal which has a phase dependent upon the bearing of the receiver with respect to the ODR transmitter. The output of the receiver 2 is divided into two channels, one of which comprises a ten kilocycle filter 3, feeding a discriminator 4 tuned to a center frequency of ten kilocycles and providing at its output a thirty cycle fixed phase modulation which may be isolated by an appropriate filter 5. The output of the filter 5 is applied to a phase splitter 6, separate output phases of which are applied to a pair of mutually perpendicular plates 7 of a cathode ray tube indicator 8, the remaining plates 9 of which are grounded. In this manner the beam of the cathode ray tube 8 is caused to rotate continuously, each cycle of rotation corresponding precisely with one cycle of output of the filter 5 and the starting point of the trace corresponding with the initiation point of each cycle of output of the filter 5. Since the thirty cycle signal available from the filter 5 is of common phase aboard all the aircraft of the system the traces provided on the face of the cathode ray tube indicator 8 aboard each of the aircraft are synchronized and identically phased, each point about the trace corresponding with an identical time aboard each of the aircraft. The thirty cycle signal of variable phase is separated out by a filter 10 and applied to a pulse generator 11 and negative pulse clipper. The generator 11 provides extremely sharp pulses as the thirty cycle output of the filter 10 passes through zero, providing a positive pulse as the thirty cycle signal falls through zero and a negative pulse as the thirty cycle signal rises through zero. The negative pulse is suppressed and the positive pulse applied to trigger a pulse transmitter 12 which transmits on a carrier $F_1$ which is different from the carrier $F_0$ utilized for ODR transmissions. The pulse transmitter 12 may thus be seen to be pulse time position modulated in response to the phase of the thirty cycle signal provided by the filter 10, the time of occurrence of the pulse being representative within the period of the thirty cycle signal of the phase of that signal and hence of the bearing of the transmitting aircraft.

The output of the pulse generator 11 is applied not only to the pulse transmitter 12 but also over an isolating amplifier 13 to an intensifying grid 14 of the cathode ray tube indicator 8. The normal bias on the intensifier grid 14 is set to blank out the visual indications on the face of the indicator or to provide extremely light indications. The output of the pulse generator 11, being positive, intensifies the beam of the indicator 8 and causes production of a bright visible spot on the face of the indicator in response to the signal. The cathode ray tube indicator 8 is provided further with a radial deflection anode 15, having a normal bias such as to cause the trace T on the face of the tube to occur about some convenient radius. The output of the pulse generator 11 is applied to the radial deflecting anode 15 in a positive sense, causing reduction of the radius of travel of the beam of the tube simultaneously with its intensification by the intensifier grid 14. Hence, in response to each pulse generated by the pulse generator 11 and transmitted by the pulse transmitter 12, a radial line as 16 of Figure 2 is generated which represents the bearing of the local aircraft relative to the ODR transmitter 1. The cathode ray tube 8, in response to the local signals, functions merely as a phase comparator which compares the phases of the reference signal provided by the filter 5 and of the bearing representative signal provided by the filter 10.

Each of the aircraft of the system is further provided with a pulse receiver 17 tuned to receive pulses at frequency F₁. Accordingly, the pulse receiver 17 aboard each of the aircraft receives from all the aircraft pulse signals having time positions corresponding with the bearings of those aircraft with respect to ODR transmitter 1. The output of each pulse receiver 17 is applied after amplification and detection therein to the intensifier grid 14 of the associated cathode ray tube indicator 8, the amplifier 13 acting in respect to these pulses as an isolating amplifier which prevents transfer of the pulses to the input of the pulse transmitter 12 and to the radial deflection anode 15. In response to each received pulse, intensification of the beam of the cathode ray tube indicator takes place, but no radial deflection, so that bright spots 19 are produced about the trace T on the face of the indicator 8 at positions circumferentially of the trace T corresponding with time positions of the transmitted pulses within the common time interval represented by the period of the thirty cycle wave provided by the filter 5 and, consequently, to the bearings of the transmitting craft with respect to the ODR transmitter 1.

For some purposes it is desirable that not all pulses transmitted from remote aircraft be indicated aboard any given aircraft. This is especially true when a great many aircraft are flying in a given vicinity, so that reception of bearing representative pulses from each of these aircraft would badly clutter the face of the indicator 8. I have provided, accordingly, a gating wave generator 20 which is synchronized from the output of the pulse generator 11 and which provides a blanking pulse for the pulse receiver 17 for preventing reception of pulses impressed on the antenna 17a associated with the pulse receiver 17, except when those pulses arrive at times in the intervals between the blanking pulses. The blanking pulse is set to originate a predetermined time after generation of a pulse in the pulse generator 11 and to terminate a predetermined time prior to generation of a succeeding pulse. This time may be adjusted to have any desired value and, hence, may gate the receiver open over any desired range of bearings straddling the bearing of the local craft. Specifically, and referring to Figure 2 of the drawings, the gating wave may be set to initiate at time corresponding with a bearing 21 and to terminate at a time corresponding with a bearing 22, whereby only those indications 19 following within the angular sector defined by the radii 21 and 22 will be visible, all other indications being suppressed.

A further embodiment of the invention is disclosed in Figure 3 of the drawings, this embodiment being in general similar to the embodiment illustrated in Figure 1 of the drawings, and utilizing many identical components, and accordingly, common elements of Figures 1 and 3 are identified by the same numerals of reference. The embodiment of the invention illustrated in Figure 3 of the drawings is not disclosed in as great detail as was Figure 1, stress being placed primarily upon the difference between the two systems, in the description which follows. In Figure 3, as in Figure 1, pulses are provided by a pulse transmitter 12 at time positions corresponding with the bearing of the transmitting aircraft with respect to ODR transmitter. Whereas in Figure 1 rotation of the beam of the cathode ray tube indicator 8 is controlled from the thirty cycle signal of constant phase provided by the filter 5, in the system of Figure 3 rotation of the beam of the indicator 8 is controlled over phase splitter 6 which is connected to the output of the thirty cycle filter 10. Thereby, instead of providing a starting point for the trace of the indicator 8 aboard each of the craft which is identical, the trace initiates aboard each of the craft at a point about the trace T which is representative of the bearing of the craft. The phase of the trace T may, therefore, be considered to be representative of bearing aboard each craft and is no longer identical aboard the various aircraft of the system. The output of the pulser 11 is applied over an amplifier 13 to intensifying grid 14, as in the system of Figure 1, but this signal is not applied to the radial deflection anode 15, being isolated therefrom by the isolating amplifier 23. Since the output of the pulser 11 is locked to the phase of the thirty cycle signal provided by the filter 10 which is in turn locked to the phase or rotation of the trace T, intensification signal applied to the grid 14 from the pulser 11 produces a spot 24 on the face of the indicator 8 (see Figure 4) which is of unvarying position and which may be arranged to occupy the uppermost point of the trace T. Pulses received by the receiver 17 from remote aircraft are applied over an isolating amplifier 25 to the intensifying grid 14, the time positions of these pulses being representative of the bearings of the craft. Accordingly, the intensifications 26 on the face of the indicator 8 are produced in response to the output signals derived from the receiver 17 and are likewise representative of the bearings of the various remote aircraft. Because the phase of the trace T is variable, the positions of the indications 26 about the trace T no longer have significance in terms of absolute bearing, but only in terms of relative bearing with respect to the bearing of the local craft, the positions of the indications 26 representing measures of the time positions of the pulses transmitted by remote craft with respect to the pulse time position of the pulses transmitted by the local craft, as represented by the spot 24. In order to provide an absolute reference bearing on the face of the cathode ray tube 8, the output of the thirty cycle filter 5 is applied to a pulser 27, similar to the pulser 11, and the positive pulses provided by the pulser 27 are transferred over an isolating amplifier 28 to the radial deflection anode 15 and further over the amplifier 23 to the intensifying grid 14. Since the thirty cycle signal provided by the filter 5 is of invariable phase, irrespective of the bearing of the receiving aircraft, the pulse time positions of the pulses provided by the pulser 27 are of invariable phase and may be timed to have a time position corresponding with some fixed bearing, such as due north. The indications provided in response to the pulse generated by the pulser 27 are of distinctive character since they are applied not only to the intensifier grid 14 but also to the radial deflection anode 15, and provide an indication having the appearance of a radial line, as in 29 in Figure 4.

The pulse receiver 17 of Figure 3 may be gated in response to transmitted pulses, exactly as in the embodiment of Figure 1.

Since for some purposes time gating of pulse receivers 17, in the embodiments of the invention illustrated in Figures 1 and 3, is preferred, while in other situations it is not preferred, I place a switch 30 in circuit with the gating wave generator, to enable disabling thereof.

While the visual indications provided by the cathode ray tube indicator 8 of the present system suffices for most practical purposes, I further prefer to provide additionally or in substitution a facsimile type recorder 31, having a rotating cylinder 32 provided with a helical ridge 33 across which feeds a record receiving surface 34. The cylinder 32 is driven by means of a synchronizing and framing motor 34, which is driven in synchronism with the beam of the cathode ray tube indicators, in the systems of Figures 1 and 3. Specifically, in the system of Figure 1 the motor 34 is driven from the output of the filter 5 and hence in identical frame for all the aircraft of the system. In the system employing airborne equipment of the type illustrated in Figure 4, on the other hand, the motor 34 is driven from the output of the filter 10, and hence each cylinder 32, with its scanning helical ridge 33, is framed in accordance with the bearing of the aircraft carrying the associated recorder. In the system of Figure 1 the local bearing is recorded at a point laterally of the record receiving surface 35 of recorder 31 corresponding with the bearing of the local aircraft with respect to the ODR transmitter 1, bearings of all adjacent aircraft being likewise recorded at points corresponding with true bearing.

In the system of Figure 3, on the other hand, the bearing of the local craft is invariably situated, say centrally of the record receiving surface 35, regardless of the bearing of the local craft, and bearings of remote craft are recorded at positions laterally of the record receiving surface corresponding with their bearings relative to the bearing of the local craft.

The recorders 31, in each case are provided with recording platens 36, which are supplied with recording signal over a lead 37, in parallel with the intensifier grid 14, the signals being amplified and if necessary, lengthened, in amplifier 38, prior to application to recording platen 36.

While I have described two specific and preferred embodiments of the invention, it will be clear to those skilled in the pertinent art, that variations of the system as disclosed, may be resorted to without departing from the true scope of the invention, as defined in the appended claims.

What I claim and desire to secure by Letters Patent of the United States is:

1. In combination, a transmitter for providing a reference signal having equal phase omni-directionally and a bearing representative further signal having a phase dependent upon bearing from said transmitter, a receiver aboard each of a plurality of craft for receiving said signals, means for translating one of said signals aboard each of said craft into a time position modulated signal, means for transmitting said time position modulated signals from each of said craft to the remainder of said plurality of craft, and means aboard said remainder of said plurality of craft for translating said time position modulated signals into visual indications of the bearings of said plurality of craft.

2. In combination, a ground transmitter for transmitting a pair of signals, one of said pair of signals having a phase common to all bearings from said transmitter and the other of said signals having a phase at each bearing from said transmitter which is representative of said each bearing, means aboard each of a plurality of aircraft adjacent said transmitter for receiving said transmitted signals, means aboard each of said aircraft for translating one of said pair of signals into a time position modulated signal having a time position representative of the bearing of said last mentioned aircraft, and means for transmitting said time position modulated signals from said plurality of aircraft.

3. In combination, a transmitter for transmitting a pair of signals, one of said pair of signals having a phase common to all bearings from said transmitter and the other of said signals having a phase at each bearing from said transmitter which is representative of said each bearing, means aboard each of a plurality of craft adjacent said transmitter for receiving said pair of signals, a visual scanning indicator aboard each of said craft, means responsive to one of said pair of signals for controlling the scanning action of said visual scanning indicator, a periodic pulse transmitter aboard each said craft, means responsive to one of said signals for controlling times of transmissions of said periodic pulse transmitter, a pulse receiver aboard each of said craft for receiving pulses transmitted from said plurality of craft, and means responsive to received pulses aboard each of said craft for modulating said scanning indicator.

4. The combination in accordance with claim 3 wherein said visual scanning indicator comprises a cathode ray tube indicator, means responsive to one of said pair of signals for controlling movement of the cathode ray of said cathode ray tube indicator, and means responsive to received pulses for modulating the cathode ray of said cathode ray tube indicator.

5. The combination in accordance with claim 3 wherein said visual scanning indicator comprises a facsimile type recorder having a helical rotating ridge, a recording platen and a time fed record receiving surface intermediate said ridge and said platen, means responsive to one of said pair of signals for synchronizing and framing motion of said helical rotating ridge, and means responsive to received pulses for applying recording signal to said platen.

6. The combination in accordance with claim 3 wherein is further provided time gating means for said pulse receiver for gating said receiver to receive pulses periodically only over a predetermined time interval.

7. The combination in accordance with claim 3 wherein said means responsive to one of said pair of signals for controlling the scanning action of said visual scanning indicator is responsive to said one of said pair of signals having a phase common to all bearings from said transmitter.

8. The combination in accordance with claim 3 wherein said means responsive to one of said pair of signals for controlling the scanning action of said visual scanning indicator is responsive to the one of said pair of signals having a phase at each bearing from said transmitter which is representative of said each bearing.

9. In combination, a transmitter for transmitting a pair of signals, one of said pair of signals having a phase common to all bearings from said transmitter and the other of said signals having a phase at each bearing from said transmitter which is representative of said each bearing, means aboard each of a plurality of craft adjacent said transmitter for receiving said pair of signals, a visual scanning indicator aboard each of said craft, means responsive to one of said pair of signals for controlling the scanning action of said visual scanning indicator, and means responsive to another of said pair of signals for modulating indications provided by said scanning indicator, a periodic pulse transmitter aboard each of said craft, and means responsive to one of said signals for controlling the times of transmission of said periodic pulse transmitter.

10. The combination in accordance with claim 9 wherein is further provided a periodic pulse receiver aboard each of said craft for receiving pulse transmissions from said plurality of craft, and means responsive to received pulse transmission aboard each of said craft for further modulating said indications provided by said scanning indicator.

11. In combination, a transmitter for transmitting a first signal having an identical distinguishing characteristic omni-directionally from said transmitter, said transmitter transmitting a second signal having a distinguishing characteristic which is a function of bearing from said transmitter, means aboard each of a plurality of craft for receiving said first and second signals, a visual scanning indicator aboard each of said craft, means responsive to one of said pair of signals for controlling the scanning action of said visual scanning indicator, a transmitter aboard each of said craft for transmitting third signals, means responsive to one of said first and second signals for controlling said third signals, a further receiving means aboard each of said craft for receiving said third signals from said plurality of craft, and means responsive to said received third signals aboard each of said craft for modulating said scanning indicator.

12. In combination, a transmitter for transmitting a pair of signals, one of said pair of signals having a phase common to all bearings from said transmitter, and the other of said signals having a phase at each bearing from said transmitter which is representative of said each bearing, means aboard each of a plurality of craft adjacent said transmitter for receiving said pair of signals, a visual scanning indicator aboard one of said craft, means responsive to one of said signals as received aboard said one of said craft for controlling the scanning of said visual scanning indicator, a periodic pulse transmitter aboard the other of said craft, means responsive to one of said signals as received aboard the other of said craft for controlling times of transmission of said periodic pulse transmitter, a pulse receiver aboard said one of said craft for receiving pulses transmitted from said other of said craft, and means responsive to said last named pulses when received for modulating said scanning indicator.

13. In combination, a transmitter for transmitting a pair of signals, one of said pair of signals having a distinguishing characteristic common to all bearings from said transmitter and the other of said signals having a distinguishing characteristic representative of bearing from said transmitter, means aboard each of a plurality of craft adjacent said transmitter for receiving said signals, means aboard each of said craft for translating one of said pair of signals into a time position modulated signal having a time position representative of the bearing of said translating craft, and means for transmitting said time position modulated signals from said plurality of craft.

14. In combination, a transmitter for transmitting a pair of signals, one of said pair of signals having a phase common to all bearings from said transmitter and the other of said signals having a phase at each bearing from said transmitter which is representative of said each bearing, means aboard each of a plurality of craft adjacent said transmitter for receiving said transmitted signals, means aboard each of said craft for translating one of said pair of signals into a time position modulated signal having a time position representative of the bearing of said last mentioned craft, means for transmitting said time position modulated signals from said plurality of craft, and a common receiving means for receiving and indicating simultaneously bearings of said plurality of craft.

15. In combination, a ground transmitter for transmitting a pair of signals, one of said pair of signals having a distinguishing characteristic common to all bearings from said transmitter, and the other of said signals having a distinguishing characteristic bearing from said transmitter which is representative of said each bearing, means aboard each of a plurality of craft adjacent said transmitter for receiving said transmitted signals, means aboard each of said craft for translating one of said pair of signals into a time position modulated signal having a time position representative of the bearing of said last mentioned craft, means for transmitting said time position modulated signals from said plurality of craft, and a remote receiver indicator means for translating said time position modulated signals into an indication of bearing of at least one of said craft.

16. In combination, a transmitter for transmitting a pair of signals, one of said pair of signals having a distinguishing characteristic common to all bearings from said transmitter and the other of said signals having a distinguishing characteristic at each bearing from said transmitter which is representative of said each bearing, means aboard each of a plurality of craft adjacent said transmitter for receiving said transmitted signals, means aboard each of said craft for translating said pair of signals to a further signal having a distinguishing characteristic modulated in accordance with the bearing of said last mentioned craft, means for transmitting said further signals from said plurality of craft, and means for translating said further signals in terms of bearing of said plurality of craft.

17. In combination, a transmitter for transmitting signals having a character at each bearing from said transmitter which is representative of said each bearing, means for receiving said signals and for translating said signals into further signals having a distinguishing characteristic representative of the bearing of said means for receiving, means for transmitting said further signals, and remote means for translating said further signals into a visual indication of the bearing of said means for receiving.

18. The combination in accordance with claim 3 wherein said visual scanning indicator comprises a facsimile type recorder having a helical rotating ridge, a recording platen and a time fed record receiving surface intermediate said ridge and said platen, said means for controlling scanning action comprises means responsive to said first mentioned one of said pair of signals for synchronizing and framing motion of said helical rotating ridge, and said means for modulating said scanning indicator comprises means responsive to said received pulses for applying recording signals to said platen.

19. The combination in accordance with claim 3 wherein said visual scanning indicator comprises a facsimile type recorder having a helical rotating ridge, a recording platen and a time record receiving surface intermediate said ridge and said platen, said means for controlling scanning action comprising means responsive to said other of said signals for synchronizing and framing motion of said helical rotating ridge, and said means for modulating said scanning indicator comprises means responsive to said received pulses for applying recording signals to said platen.

20. In combination, a transmitter for transmitting a pair of signals, one of said pair of signals having a phase common to all bearings from said transmitter and the other of said signals having a phase at each bearing from said transmitter which is representative of said each bearing, a plurality of craft adjacent said ground transmitter, means aboard each of said craft for receiving said pair of signals, a visual scanning indicator aboard each of said craft, means responsive to one of said pair of signals for controlling the scanning action of said visual scanning indicator, and means responsive to another of said pair of signals for modulating indications provided by said scanning indicator, wherein said visual scanning indicator comprises a facsimile type recorder having a helical rotating ridge, a recording platen and a time fed record receiving surface intermediate said ridge and said platen, means responsive to one of said pair of signals for synchronizing and framing motion of said helical rotating ridge, and means responsive to another of said pair of signals for applying recording signal to said platen.

21. In combination, a transmitter for radiating a composite signal having a first characteristic common to all bearings from said transmitter and a further characteristic at each bearing from said transmitter which is representative of said each bearing, means aboard each of a plurality of craft adjacent said transmitter for receiving said radiated signals, means aboard each of said craft for translating said radiated signals as received to a further signal representative of the bearing of each transmitting craft and for radiating said further signal, means aboard at least one of said craft for receiving said further signals and for translating said further signals into visual indications of bearings of the remainder of said plurality of craft.

22. The combination in accordance with claim 21 wherein said indications comprise a permanent recording of said bearings.

23. The combination in accordance with claim 21 wherein said last named means comprises means for indicating only the relative bearings of the receiving craft and said remainder of said plurality of craft.

24. The combination in accordance with claim 21 wherein said last means comprises means for indicating bearing of said at least one of said craft and wherein bearing of said at least one of said craft and said bearing of said plurality of craft are distinguishably indicated.

MARCEL WALLACE.

REFERENCES CITED

The following references are of record in the file of this patent:

UNITED STATES PATENTS

| Number | Name | Date |
| --- | --- | --- |
| 2,252,083 | Luck | Aug. 12, 1941 |
| 2,288,815 | Luck | July 7, 1942 |
| 2,343,196 | Luck | Feb. 29, 1944 |
| 2,377,902 | Relson | June 12, 1945 |
| 2,403,603 | Korn | July 9, 1946 |
| 2,434,531 | Wilson et al. | Jan. 13, 1948 |